US010357722B2

(12) United States Patent
White et al.

(10) Patent No.: US 10,357,722 B2
(45) Date of Patent: Jul. 23, 2019

(54) SEATED MOTION SIMULATION AMUSEMENT PARK ATTRACTION

(71) Applicant: Universal City Studios LLC, Orlando, FL (US)

(72) Inventors: Nathanael G. White, Orlando, FL (US); Ted W. Van Winkle, Celebration, FL (US); Daniel Freedman, Ocoee, FL (US); Justin Michael Schwartz, Orlando, FL (US); Dwain South, Orlando, FL (US); Michael Tresaugue, Windermere, FL (US); Gregory Hall, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/852,744

(22) Filed: Dec. 22, 2017

(65) Prior Publication Data
US 2018/0304160 A1     Oct. 25, 2018

Related U.S. Application Data
(60) Provisional application No. 62/489,895, filed on Apr. 25, 2017.

(51) Int. Cl.
*A63G 21/20*     (2006.01)
*A63G 7/00*     (2006.01)
(Continued)

(52) U.S. Cl.
CPC .............. *A63G 21/20* (2013.01); *A63G 7/00* (2013.01); *A63G 31/08* (2013.01); *A63G 31/14* (2013.01); *A63G 31/16* (2013.01); *G06T 19/006* (2013.01)

(58) Field of Classification Search
CPC .......... A63G 21/20; A63G 7/00; A63G 31/16
(Continued)

(56) References Cited

U.S. PATENT DOCUMENTS 5,979,333 A  *  11/1999  Houben .................. A63G 21/22
                                                         104/63
8,453,576 B2      6/2013  Roodenburg et al.
(Continued)

FOREIGN PATENT DOCUMENTS

CN          101966394        2/2011
DE           29900098        5/2000
(Continued)

OTHER PUBLICATIONS

Motorcycle Roller Coaster—The Gentleman Racer; http://www.thegentlemanracer.com/2012/07/motorcycle-roller-coaster.html Jul. 2012.
(Continued)

*Primary Examiner* — Michael D Dennis
(74) *Attorney, Agent, or Firm* — Fletcher Yoder, P.C.

(57) ABSTRACT

A motion simulator ride assembly including a motion base and a rider support assembly positioned beneath and coupled to the motion base. The rider support assembly includes a plurality of rider support units each including a saddle having a leading end, a tail end, and a superior surface that may support a rider in a facedown position and a restraint system that may secure the rider onto the rider support. The restraint system includes a rotating restraint having an attachment point on the saddle, and the rotating restraint may move relative to the superior surface to move the rotating restraint from an unrestrained configuration to a restrained configuration, and the rotating restraint may abut against a posterior surface of a torso of the rider when the rotating restraint is in the restrained configuration. The
(Continued)

motion simulator ride assembly also includes a display screen that may project a simulated environment. The display screen is positioned below the motion base.

19 Claims, 10 Drawing Sheets

(51) Int. Cl.
*A63G 31/16* (2006.01)
*A63G 31/08* (2006.01)
*A63G 31/14* (2006.01)
*G06T 19/00* (2011.01)

(58) Field of Classification Search
USPC ............................................. 104/93, 63, 53
See application file for complete search history.

(56) References Cited

U.S. PATENT DOCUMENTS

| | | |
|---|---|---|
| 9,302,190 B1 | 4/2016 | Jennings |
| 9,303,421 B1 | 4/2016 | Jennings |
| 9,732,535 B2 | 8/2017 | Jennings |
| 9,914,428 B2* | 3/2018 | Zamperla .......... B60R 21/01512 |
| 2003/0024428 A1* | 2/2003 | Kroon .................... A63G 27/04 |
| | | 104/53 |
| 2005/0001466 A1 | 1/2005 | Zambelli et al. |
| 2008/0051205 A1 | 2/2008 | Roodenburg et al. |
| 2009/0031913 A1* | 2/2009 | Heaslip .................... A63G 7/00 |
| | | 104/63 |
| 2010/0236444 A1 | 9/2010 | Blonk et al. |
| 2011/0048274 A1* | 3/2011 | Roodenburg ............ A63G 7/00 |
| | | 104/53 |
| 2012/0312186 A1* | 12/2012 | Shasha .................... A63G 1/30 |
| | | 104/93 |
| 2013/0017893 A1* | 1/2013 | Feuer ....................... A63G 7/00 |
| | | 472/43 |

FOREIGN PATENT DOCUMENTS

| | | |
|---|---|---|
| DE | 20217754 U1 | 3/2003 |
| EP | 2253362 A1 | 11/2010 |
| RU | 2264838 C1 | 11/2005 |
| WO | 2004073818 A1 | 9/2004 |
| WO | 2007055572 A1 | 5/2007 |

OTHER PUBLICATIONS

Canada's Wonderland debuts new Skyhawk ride this weekend | Toronto Star https://www.thestar.com/news/insight/2016/05/01/canadas-wonderland- . . . May 1, 2016.
MotoGP Motorcycle Racing; https://www.videoamusement.com/racing-simulators-rental/motogp-motorcycle-racing/Accessed on Oct. 10, 2017.
Plane Rudder; http://www.start-flying.com.new%20site/controlling_aircraft.htm—Accessed on Oct. 10, 2017.
PCT/US2018/028938 Invitation to Pay Additional Fees dated Aug. 6, 2018.

* cited by examiner

SEATED MOTION SIMULATION AMUSEMENT PARK ATTRACTION

CROSS-REFERENCE TO RELATED APPLICATIONS

This application claims the benefit of U.S. Provisional Application No. 62/489,895, filed Apr. 25, 2017, which is hereby incorporated by reference in its entirety.

BACKGROUND

The present disclosure relates generally to the field of amusement parks. More particularly, embodiments of the present disclosure relate to systems and methods for amusement park rides with motion simulation.

Various amusement rides have been created to provide passengers with unique motion and visual experiences. In one example, roller coasters and theme rides can be implemented with multi-passenger vehicles that travel along a fixed path. In addition to the excitement created by the speed or change in direction of the vehicles as they move along the path, the vehicles themselves may generate special effects, e.g., sound and/or motion effects. Although a repeat rider may be familiar with the general path of the ride, the special effects may create interest during second and subsequent rides. In another example, certain rides may be implemented with projection elements to create varying scenery and movement as the passenger vehicles travel along the path. However, it is now recognized that regardless of such enhancements to these passenger vehicle rides, the rider in the passenger vehicle may not feel immersed in the ride. For example, the rider generally is aware of being within a ride due, in part, to the confines of the vehicle itself. However, the rider may not be properly positioned within the ride to fully experience movements simulated by the ride. Accordingly, there is a need for an improved amusement ride vehicle that simulates certain experiences.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a motion simulator ride assembly including a motion base and a rider support assembly positioned beneath and coupled to the motion base. The rider support assembly includes a plurality of rider support units each including a saddle having leading end, a tail end, and a superior surface that may support a rider in a facedown position and a restraint system that may secure the rider onto the rider support. The restraint system includes a rotating restraint having an attachment point on the saddle, and the rotating restraint may move relative to the superior surface to move the rotating restraint from an unrestrained configuration to a restrained configuration, and the rotating restraint may abut against a posterior surface of a torso of the rider when the rotating restraint is in the restrained configuration. The motion simulator ride assembly also includes a display screen that may project a simulated environment. The display screen is positioned below the motion base.

In accordance with another embodiment, a ride system including an individual rider support unit, a saddle of the individual rider support unit having a leading end, a tail end, and a superior surface configured to support a rider in contact with the superior surface in a hunched position, and a restraint system coupled to the individual rider support and having a rotating restraint. The rotating restraint may rotate relative to the superior surface to move the rotating restraint from an unrestrained configuration to a restrained configuration, and the rotating restraint may abut a posterior surface of a torso of the rider when the rotating restraint is in the restrained configuration.

In accordance with another embodiment, a rider support assembly including one or more rider support units each including a saddle having a leading end, a tail end, and a superior surface extending between the leading end and the tail end. The superior surface may support a rider of a motion simulator ride in a facedown position. The rider support assembly also includes a restraint system including a torso posterior restraint having a rotating restraint extending from a leading end of the saddle and that may move relative to the superior surface from an unrestrained configuration to a restrained configuration. The torso posterior restraint abuts a posterior surface of a torso of the rider when the torso posterior restraint is in the restrained configuration. The rider support assembly also includes a tail-end restraint having a free end and a coupled end. In the unrestrained configuration, the free end of the tail-end restraint is positioned substantially level with or below the superior surface and, in the restrained configuration, the free end of the tail-end restraint is positioned above the superior surface.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
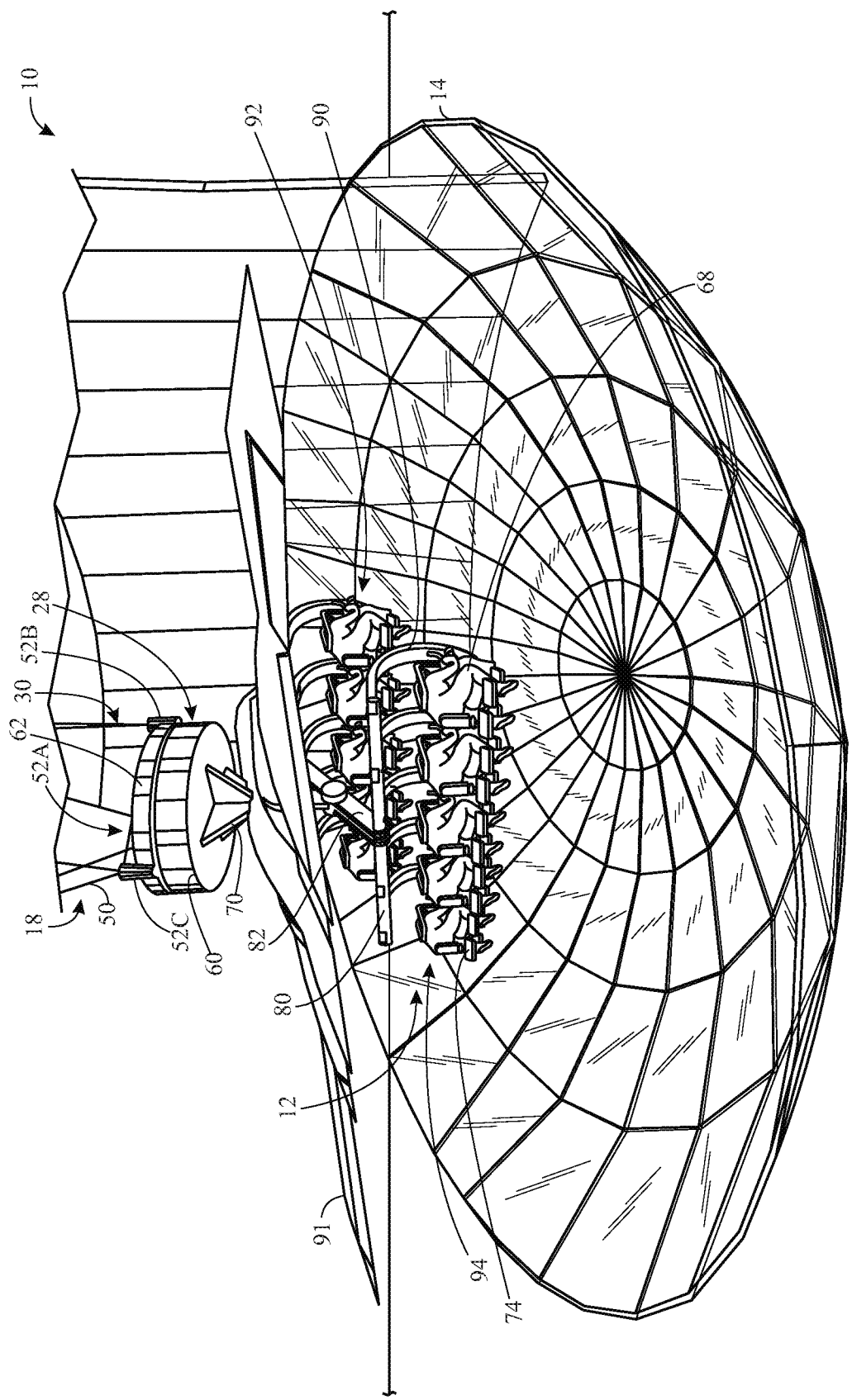
FIG. 1 is a perspective view of a motion simulator ride assembly in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain existing motion simulator ride vehicles may not be suitable for simulating certain motions, such as the feeling of riding on a back of an animal, motorcycling, or similar experiences in which the rider is straddling a seat or support of the ride. For example, certain motion simulator ride vehicles may be housed within individual dedicated pods or enclosures that include walls to facilitate visual displays or to enclose motion effects machinery. However, such enclosures may separate a rider from the desired environment and block enhancing sensations, such as airflow effects associated with speed, during the ride. As such, the motion simulator ride vehicle may be unable to provide the rider the feeling of riding (e.g., motorcycling). In addition, the configuration of certain motion simulator ride vehicles may restrict movement by the rider, which in turn may not facilitate realistic feedback from arm and leg movement to create an improved simulation of riding (e.g., on a horse), for example.

Due to the configuration of certain motion simulator ride vehicles, a position of a display screen that displays a simulated environment during operation of the motion simulator ride may not be suitable for simulating the feeling of riding (e.g., a horse or motorcycle). For example, certain motion simulator rides may have a domed projection screen that displays the simulated environment positioned above the motion simulator ride vehicle. Therefore, it may be difficult to create a feeling of riding (e.g., motorcycling) because the rider does not view the environment in a more natural and comfortable rider gaze position (e.g., generally straight ahead to generally downward) as one would be if they were riding a motorcycle, for example. Accordingly, provided herein is a motion simulator ride system having a rider support assembly that allows the rider to experience the feeling of riding on the back of an animal and/or motorcycling, as examples. For example, the motion simulator ride system may include an actuatable rider support assembly that positions the rider to allow the rider to face downwards or with a generally natural gaze orientation during operation of the motion simulator ride. The motion simulator ride may also include visual effects devices (e.g., screens, headsets) that are positioned to account for, in one example, generally downward gaze positions. Accordingly, disclosed herein are restraint systems for use in conjunction with the rider support assembly and that comfortably restrain a rider as the rider support assembly is actuated in various directions. The restraint system may, in an embodiment, be configured to permit walk-on boarding onto a seat of the rider support assembly as opposed to configurations in which the rider throws a leg over the seat.

The rider support assembly disclosed herein may be implemented without a dedicated enclosure for each individual ride vehicle that, for example, separates a single ride vehicle from other vehicles in the ride. In this manner, although each vehicle may be configured to support a single rider (or, in certain embodiments, two or more riders), the ride may nonetheless accommodate multiple individual vehicles that simultaneously experience certain special effects (wind effects, visual effects, audio effects, water effects) in the ride. Accordingly, the immersive ride experience may be more efficiently provided to an entire group of riders. Further, such a configuration may permit enhanced ride throughput by allowing multiple riders at one time. The present techniques are in contrast to vehicle-based simulation in which the rider is separated from the environment by a totally or partially enclosed vehicle. While such vehicles may have generally wide fields of view via windows or transparent walls, the feeling of horseback riding and/or motorcycling, for example, is reduced because the rider does not feel airflow during the ride and because the vehicle walls separate the rider from the environment. In addition, a rider in a vehicle does not feel realistic feedback from arm and leg movement to create an improved simulation of horseback riding and/or motorcycling.

The rider support assembly may have certain features that enable the rider to have arm and leg movements that simulate riding. For example, the rider support assembly may include a rider support having a slanted "cycle-like"

configuration that allows the rider to be supported in a facedown or hunched over position. For example, the rider support may allow the rider to be positioned with a portion of their front side resting on a superior surface of the rider support. In this way, the rider may look down at the environment, e.g., projected on a display screen positioned below the rider. By positioning the rider in a facedown position or on a vehicle that, at least in some orientations, permits a downward gaze, the rider may experience a sensation and feeling of horseback riding, motorcycling, or the like. Additionally, the disclosed rider support assembly may allow the rider to experience sudden moments of positive and negative gravitational forces (e.g., g-forces) that enhance the sensation of riding or motorcycling, and provide a more pleasurable riding experience.

While the disclosed embodiments are generally described in the context of amusement park rides, it should be understood that the motion simulator ride as provided herein may also be used in other contexts. For example, the motion simulator ride may be used for sports training (e.g., cycling, motorcycling, horseback riding, etc.), or therapy purposes.

FIGS. 1-4 are perspective views of a motion simulator ride 10 including an embodiment of a rider support assembly 12 that may be used to position a rider above a display screen, e.g., a domed projection screen 14 (FIG. 1), or in conjunction with a headset or vehicle display associated with the rider support assembly 12. The rider support assembly 12 may include, or be part of, a transport system 18 that supports and moves the rider support assembly 12 along a path of the motion simulator ride 10. Additionally, the transport system 18 may include a motion base 28 that attaches to the rider support assembly 12 and a cable suspension rig 30 that drives the motion base 28 to facilitate movement of the rider support assembly 12 during operation of the motion simulator ride 10. The motion base 28 may be suspended (e.g., from the cable suspension rig 30), and may in turn couple to or otherwise suspend the rider support assembly 12. The rider support assembly 12 may be an integral component of the motion base 28 or may be a separate structure that is attached to the motion base 28 by any suitable attachment technique (e.g., fasteners, cables, support beams, welding, or the like). In this manner, the rider support assembly 12 is actuated in response to actuation of the motion base to cause a variety of motion effects.

Figure 2:
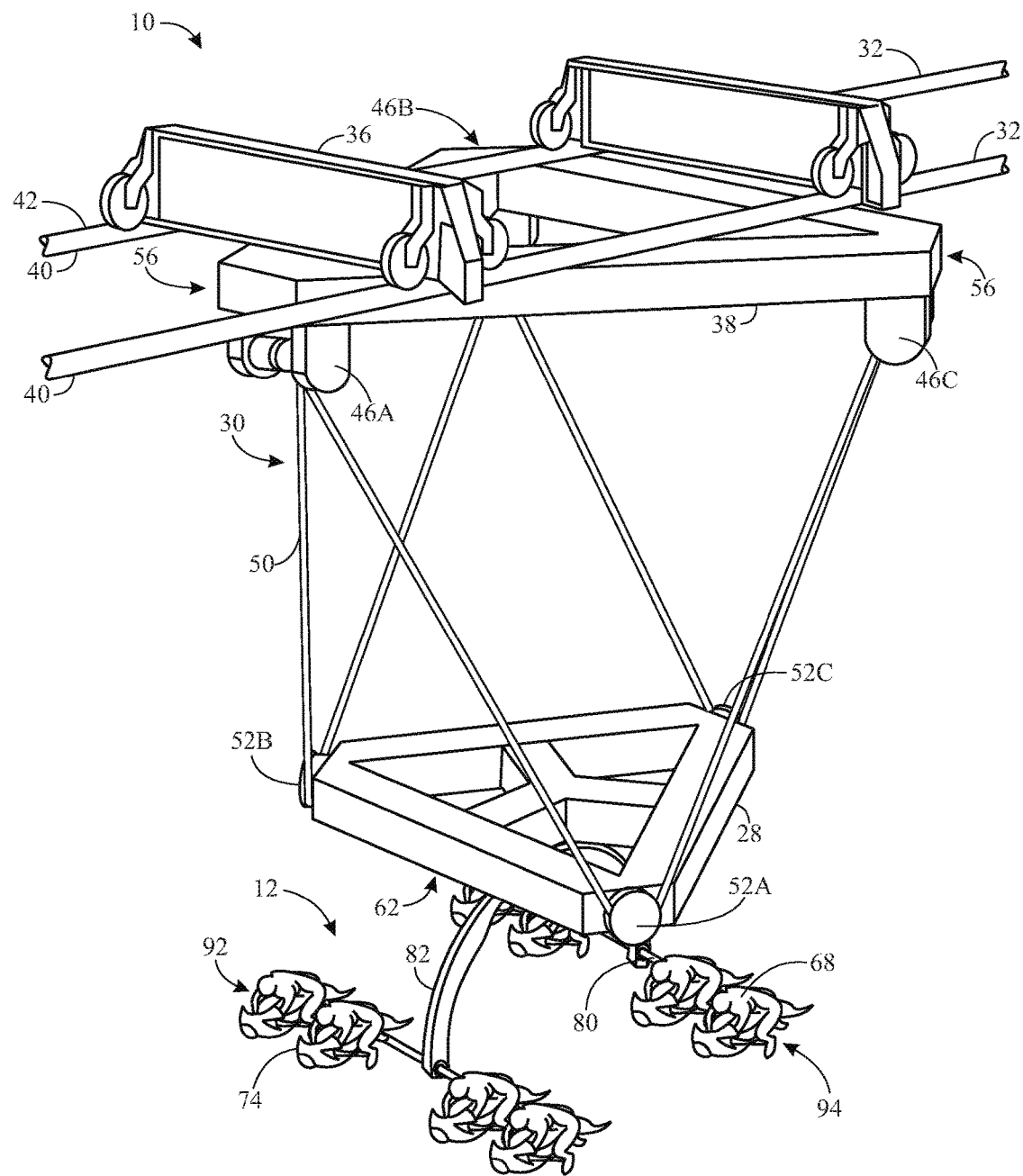
FIG. 2 is a perspective view of a motion simulator ride assembly having a cable suspension rig and bogie, in accordance with an embodiment of the present disclosure.
Figure 3:
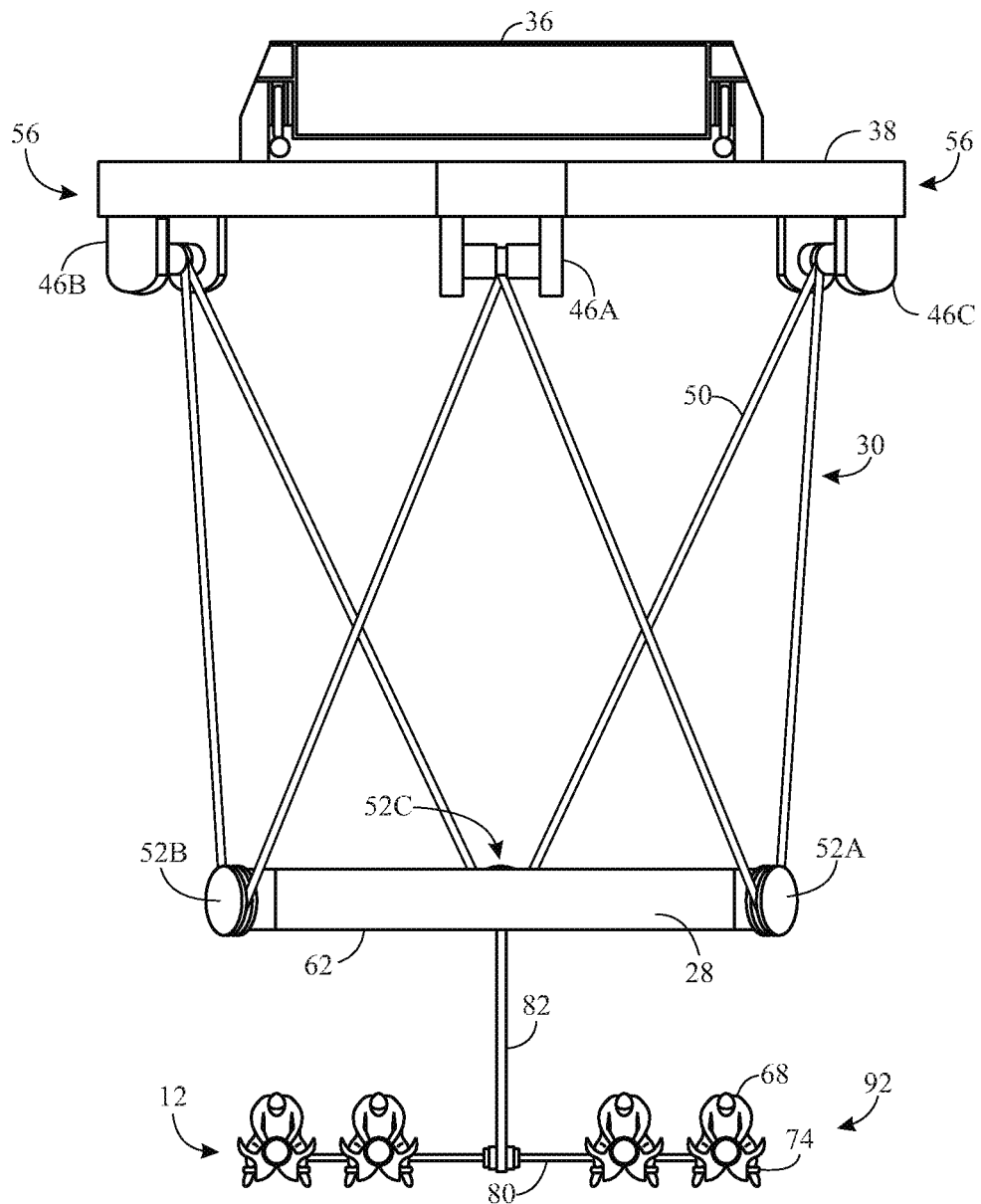
FIG. 3 is front view of the motion simulator ride assembly of FIG. 2.
Figure 4:
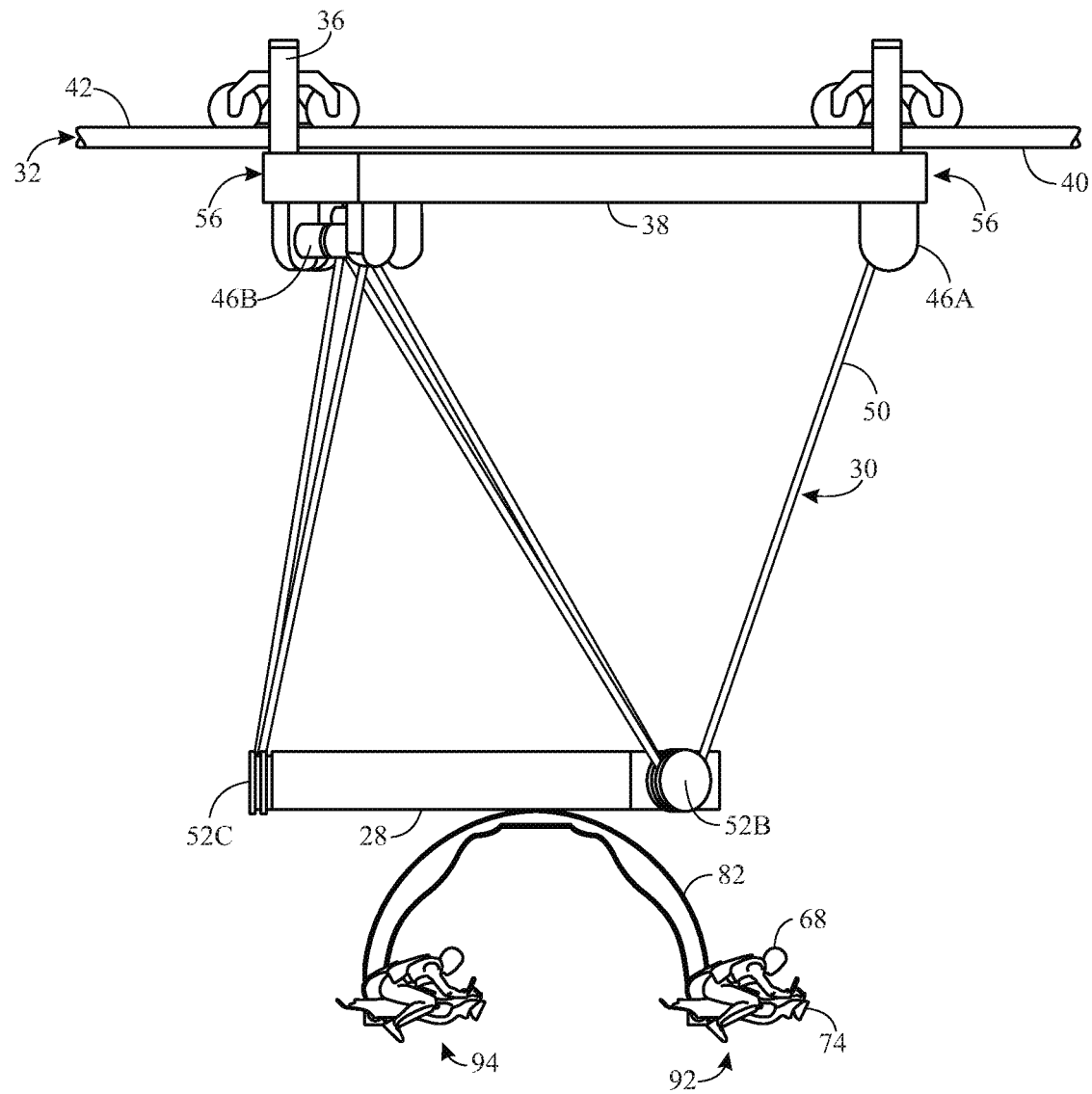
FIG. 4 is side view of the motion simulator ride assembly of FIG. 2.

In an embodiment, the transport system 18 may be coupled to ride tracks 32, as shown in FIG. 2. FIG. 3 is front view of the motion simulator ride assembly of FIG. 2, and FIG. 4 is side view of the motion simulator ride assembly of FIG. 2. In operation, a bogie 36 of the transport system 18 travels along the ride tracks 32 to move the rider support assembly 12 along a ride path during the ride 10. The bogie 36 may include pinch wheels or other components to facilitate movement along the ride tracks 32. The bogie 36 is coupled to a subframe 38 that includes the cable suspension rig 30. As depicted, subframe 38 and the cable suspension rig 30 are positioned on an underside 40 of the ride tracks 32. However, other arrangements are also contemplated. For example, certain components of the subframe 38 and/or the cable suspension rig 30 may be positioned on a topside 42 of the ride tracks 32 in other embodiments. The subframe 38 may include one or more cable control assemblies 46, e.g., cable control assemblies 46a, 46b, and 46c, connected via the subframe 38. Various components of the ride 10 may be coupled to a power source. In one embodiment, the ride components (e.g., the cable control assemblies 46, special effects controllers, motors) may draw power from the power source powering the bogie 36. The bogie 36, in turn, may be coupled to a power source via a cable. In one embodiment, the bogie 36 draws power from the tracks 32 via an electrical contact.

Each cable control assembly 46 (e.g., motorized winch system) is coupled to one or more cables 50 suspending the motion base 28. The motion base 28 includes cable connector elements 52a, 52b, and 52c (e.g., connectors, grippers, rings) configured to receive one or more cables 50. The cable connector elements 52 may be distributed about a perimeter of the motion base 28 along an upper surface or, in another embodiment, along a side of the motion base 28. The cables 50 are coupled to the motion base 28 and the cable control assemblies 46 such that movement of the motion base 28 may be generated by selective control of an amount of cable extending from the cable control assemblies 46 coupled to various cable connector elements 52 on the motion base 28. An individual cable control assembly 46 may include a winch, pulley, spooling system, motor and/or other cable mechanical controllers that are configured to change a distance between the cable control assembly 46 and the motion base 28 by, for example, spooling or unspooling the cable 50 such that an amount (or length) of cable extending from the cable control assembly 46 to the cable connector element 52 is changed. In one embodiment, the distance between the cable control assembly 46 and the motion base 28 is increased when the cable 50 is unspooled such that an amount of cable 50 extending from the cable control assembly 46 to the cable connector element 52 is increased. Because the motion base 28 is coupled to several cables 50 and associated cable control assemblies 46, the type of motion patterns generated by changing the configuration of various cables 50 may be complex.

The cable suspension rig 30, via control of the cable control assemblies 46 and under control of a control system (see FIG. 18), is capable of causing the motion base 28 to move in multiple degrees of freedom. Such motion may include pitch, roll, and heave as well as surge, sway, and yaw, either alone or in combination with one another. Accordingly, the motion base 28 may be configured to create all six degrees of freedom, depending on the implementation and arrangement of the cables 50, e.g., via different amounts, lengths, or portions of cable 50 spooled out. In a particular embodiment, as shown in FIGS. 2-4, the cable suspension rig 30 includes at least three cable control assemblies 46 arranged in a triangle formation with the cable control assemblies 46 positioned generally at each corner 56. Certain motion patterns may be created by manipulating the cable 50, e.g., by using a motor of the cable control assembly 46 to wind the cable 50 or to unwind the cable 50. Further, each individual cable control assembly 46 may have cables 50 coupled to one or more cable connector elements 52 on the motion base 28 to generate more complexity and variability of motion. In this manner, the rider support assembly 12 is actuated to generate the motion simulation experience.

In one example, the motion base 28 may roll (where the forward direction of the tracks 32 is considered the x-axis), when the unspooled portion of the cables 50 connected to cable connector element 52a and 52b is decreased and/or the unspooled portion of the cables 50 connected to cable connector element 52c is increased. The reverse pattern would create roll towards the opposite direction. Further, forward pitch may be created by raising the cable connector element 52a relative to the cable connector element 52c, while the reverse of the pattern would generate backwards pitch. In one embodiment, the cable suspension rig 30 is capable of producing 30 degree pitch or roll in the motion base 28. Heave may be generated by an up and down motion, created by simultaneous winding and subsequent releasing of all of the cables 50 to move the motion base 28 up and down. In another embodiment, the cable suspension rig 30 is capable of producing up to 18 ft. heave, for example. Further, the heave motion may include a superimposed pitch or roll. Other combinations are also contemplated, and motion in any of the six degrees of freedom may be combined in series in a programmed pattern to create various types of flight or motion simulation experiences.

The transport system 18 may use other driving systems that do not include the cable suspension rig 30 or work in combination with the cable suspension rig 30 to drive the transport system 18. For example, in certain embodiments, the transport system 18 may include a robotic arm or a cantilevered arm that drives movement of the transport system 18 to provide the rider with the feeling of riding a motorcycle/bicycle, riding an animal, or the like. Accordingly, the slightest movement of the transport system 18 may create new forces on the rider's body due, in part, to the distribution of gravitational forces. For example, the configuration of the rider support assembly 12 may allow the rider to be in a forward slant position. By positioning the rider in the forward slant position, the gravitation forces acting on the rider allow the ride 10 to provide a feeling of motorcycling, or the like. The disclosed restraint systems may be used to comfortably restrain the rider during actuation.

In certain embodiments, the motion base 28 may include a rotator ring 60 that is capable of complete or partial rotation, e.g., under control of a motor, relative to a motion base suspended support 62 to generate additional types of motion, as illustrated in FIG. 1. In one embodiment, the rotator ring 60 is coupled to a central rod that in turn is coupled to a motor that turns the rod to rotate the rotator ring 60.

In operation, motion of the motion base 28 is translated to riders 68, who are coupled to the rider support assembly 12 via a support 82 that in turn is coupled to the rider support assembly 12 including the one or more rider support units 74. The support 82 extends downwards and away from the tracks 32 (and the motion base 28) to suspend the rider support assembly 12 and, in turn, the rider support units 74. As shown in FIGS. 1-4, the support 82 extends downwardly (e.g., in a direction away from the bogie 36) from the motion base suspended support 62 of the motion base 28. In embodiments in which the motion base 28 includes the rotator ring 60, the support 82 may be directly coupled to the rotator ring 60 such that rotation of the rotator ring 60 also rotates the support 82 and, in turn, the riders 68 secured in the rider support units 74, as illustrated in FIG. 1. In one embodiment, the riders 68 may face forward along the axis of forward movement along the ride tracks 32 as the bogie 36 moves to enhance a feeling of riding (e.g., a motorcycle or the like). However, in other embodiments, the riders 68 may be rotated during the ride 10 (i.e., via rotation of the rotator ring 60 either direction) to face objects of interest or to enhance certain effects, such as being thrown sideways by an impact.

The support 82 is coupled to a base member 80 of the rider support assembly. In certain embodiments, the support 82 is configured to rotate relative to the motion base 28 to move the rider support units 74 about the axis of rotation. The support 82 may be coupled to additional base members 80 that include other rows of rider support units 74. The support 82 may be coupled to a motor to control the rotation of the support 82 relative to motion base 28.

In the embodiment depicted in FIGS. 2-4, the base member 80 extends along a multi-rider row and is attached to or forms part of the rider support units 74. In multi-rider embodiments, the base member 80 may extend from the support 82 to accommodate a plurality of rider support units 74 along its length (e.g., including any rider securing components associated with each rider support unit 74, such as back, leg, and/or tail-end restraints). In certain embodiments, the base member 80 may include extending arms 90 that couple the rider support units 74 to the base member 80, as illustrated in FIG. 1.

The rider support units 74 are arranged in a manner that allows each rider 68 to have a desirable field of view of the environment projected by the display screen (e.g., the domed projection screen 14) positioned below the rider support assembly 12 or any other suitable display screen (e.g., a display of a rider-worn headset). For example, in certain embodiments, the rider support assembly 12 may include an array (e.g., group) of 2-10 rider support units 74. However, the rider support assembly 12 may include any other suitable number of rider support units 74 that allow the rider 68 to have a positive ride experience.

As discussed herein, the disclosed rider support assembly 12 may provide the rider 68 of the motion simulator ride 10 with a feeling of riding on the back of an animal, bicycling, motorcycling, or the like by positioning the rider 68 in a prone position over a display screen (e.g., the domed projection screen 14 or other suitable display screen). Once the rider 68 is secured to the rider support assembly 12, a control system of the motion simulator ride 10 may instruct the transport system 18 to raise the rider support assembly 12 off the ground and transport the rider 68 over the domed projection screen 14 positioned beneath at least a portion of the rider support assembly 12, thereby suspending the rider 68 within the ride 10. The transport system 18, in combination with the rider support assembly 12, may facilitate movement of the rider support units 74 in a manner that allows the rider 68 to experience the feeling of riding a bicycle, motorcycle, on the back of an animal, or the like. For example, in certain embodiments, the rider support assembly 12 allows the rider 68 to be positioned above and look down toward the domed projection screen 14 positioned below the rider support assembly 12. As the cable suspension rig 30 drives movement of the rider support assembly 12 and movement of all associated rider support units 74, the airflow through the rider's body (e.g., arms and legs) may allow the rider 68 to experience the feeling of motorcycling/bicycling. The motion simulator ride may also include a canopy 91 (FIG. 1) or other structure to shield the motion base 28 and other ride structures from rider view.

In one embodiment, the rider support assembly 12 includes multiple rows of rider support units 74. For example, as illustrated in FIGS. 1-4, the rider support assembly 12 includes a first row 92 (e.g. a front row) having a portion of the rider support units 74 and a second row 94 (e.g., a back row) having another portion of rider support units 74. In certain embodiments, the first row 92 may be positioned above or below the second row 94. That is, the first row 92 and the second row 94 may not be horizontally aligned. In one embodiment, the rider support assembly 12 may transition the first row 92 and the second row 94 between different alignments, for example, as a transition between loading and operating modes. During loading and unloading modes, the first row 92 may be below the second row 94 to facilitate mounting or demounting the rider support units 74 by the riders 68. After loading or unloading the riders 68 in the first row 92, the rider support assembly 12 may position the second row 94 below the first row 92 to facilitate mounting or demounting of the riders 68 from the second row 94. In one embodiment, both rows 92, 94 are approximately even (e.g., at the same level) during loading and unloading. In this particular embodiment, once the ride 10 is in operation, the rows 92, 94 may be offset to, for example, provide unobstructed views to the riders 68. Additionally, in operation mode, the transport system 18 may move the rider support assembly 12 in a manner that transitions the alignment of the first row 92 and the second row 94 to simulate a desired motion that allows the riders 68 to experience the feeling of riding (e.g., on the back of an animal, bike ride, or motorcycling).

Figure 5:
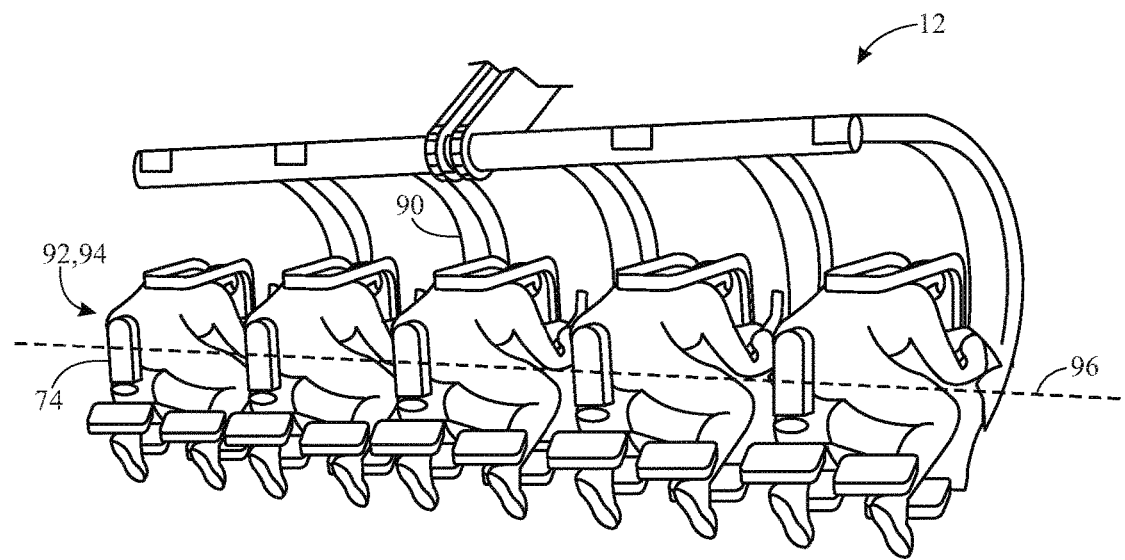
FIG. 5 is a detail view of rider support assembly of the motion simulator ride assembly of FIG. 1 having multiple rider support units arranged in a row, whereby the rider support units are aligned along an axis of the row, in accordance with an embodiment of the present disclosure.
Figure 6:
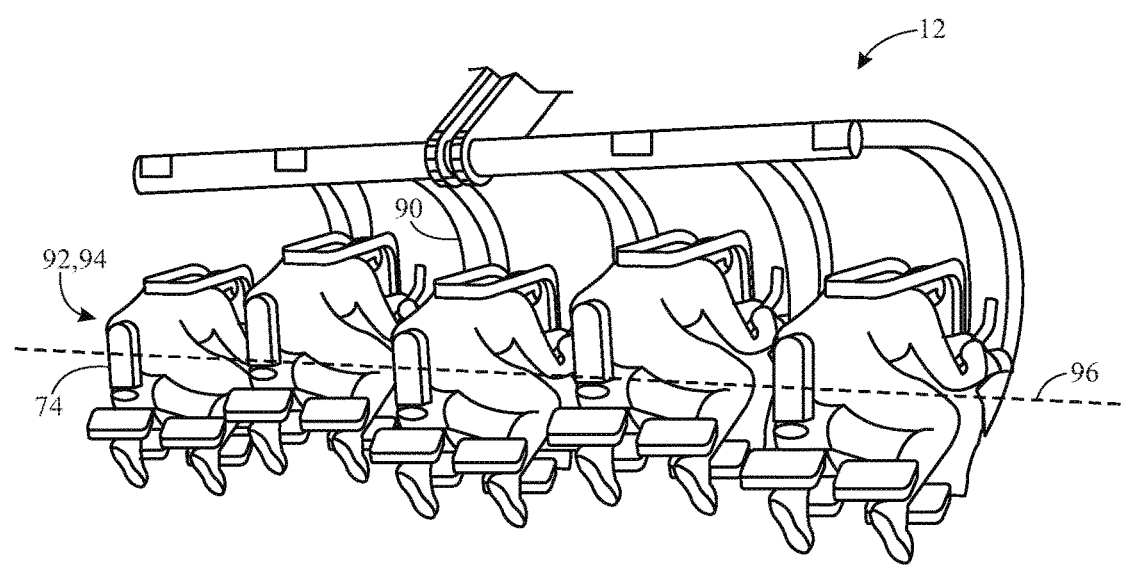
FIG. 6 is a detailed view of a rider support assembly of the motion simulator ride assembly of FIG. 1 having multiple rider support units arranged in a row, whereby the rider support units are staggered along an axis of the row, in accordance with an embodiment of the present disclosure.

In other embodiments, the first row 92 and the second row 94 are at the same level such that the first row 92 and second row 94 are horizontally aligned (or positioned along the same horizontal plane). In one embodiment, the rows 92, 94 have the same number of rider support units 74. In other embodiments, the rows 92, 94 have a different number of rider support units 74. The rider support units 74 along each row 92, 94 may be in a staggered configuration or may be aligned. For example, as illustrated in FIG. 5, the rider support units 74 in the row 92, 94 are aligned along a centerline axis 96 of the row 92, 94. FIG. 6 illustrates at least a portion of the rider support units 74 being offset from the centerline axis 96 such that the rider support units 74 along the row 92, 94 are in a staggered configuration. In an embodiment, the arm 90 may be positioned on a side of or out of a direct line of sight for the rider 68.

Figure 7:
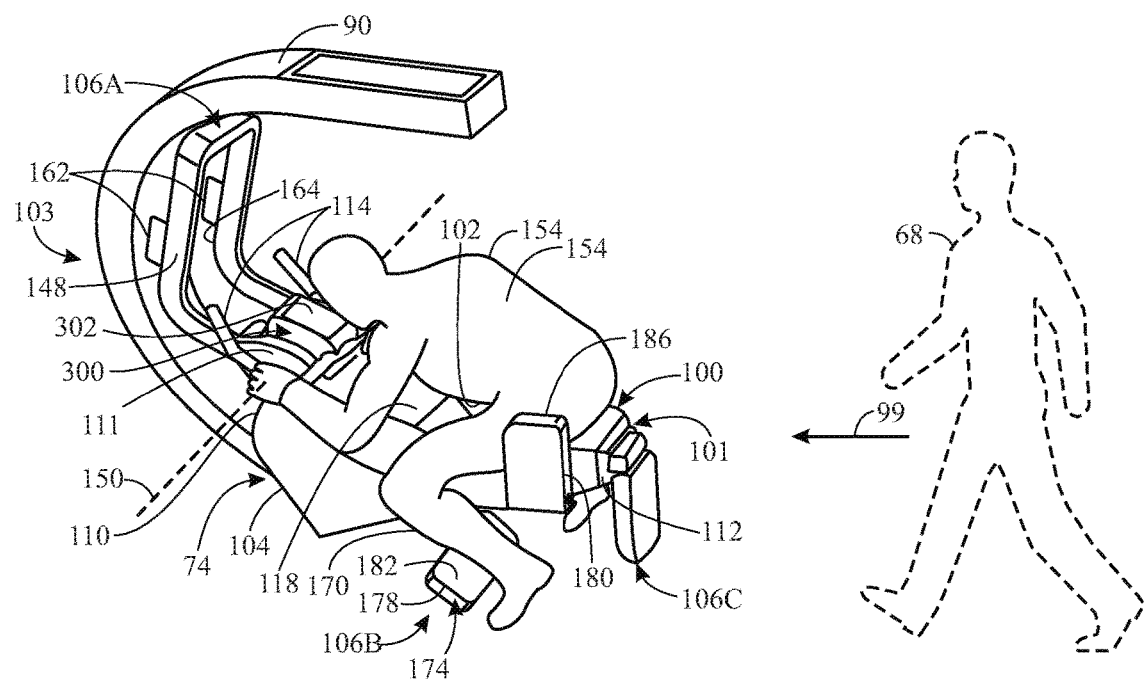
FIG. 7 is perspective view of the rider support unit of FIGS. 5 and 6 including a restraint system having a movable back, tail-end, and leg restraint, whereby the movable back restraint extends to an upper back of a rider and the restraint system is in a unrestrained configuration, in accordance with an embodiment of the present disclosure.
Figure 8:
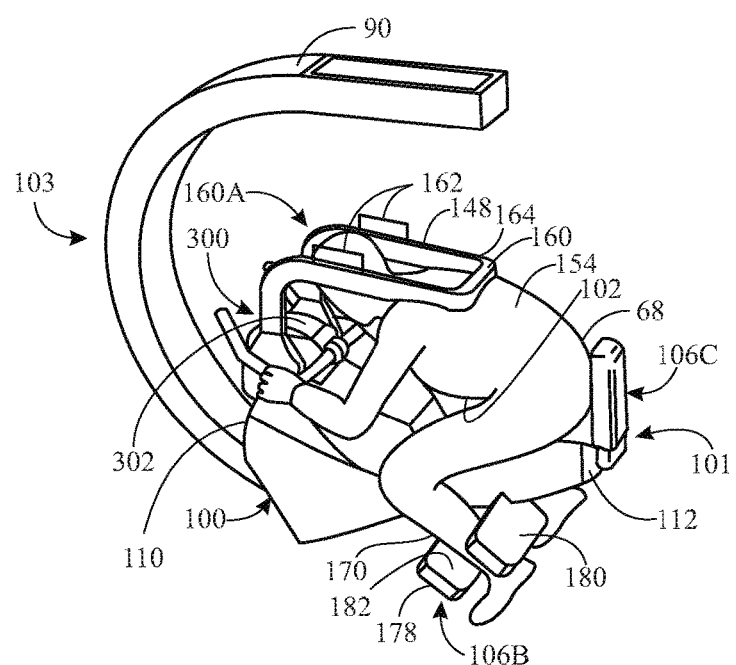
FIG. 8 is perspective view of the rider support unit of FIG. 7, whereby the restraint system is in a restrained configuration.

Each individual rider support unit 74 may include various features to secure the rider 68 to the rider support assembly 12. FIGS. 7 and 8 illustrate an embodiment of the rider support units 74 that facilitates walk-on boarding to facilitate the rider 68 assuming a position straddling the rider support unit 74. The rider 68 approaches the rider support unit 74 in a direction 99 from a rear 101 of the rider support unit 74 that is generally free of obstructions, which are generally positioned at a front 103. The rider support unit 74 may include various actuatable restraints that, in an unconstrained or loading configuration, also are in position to permit ride entry from the rear 101 of the rider support unit 74. FIG. 7 shows the rider support unit 74 in the loading or unrestrained configuration, and FIG. 8 shows the rider support unit 74 in the restrained or ride configuration.

Each individual rider support unit 74 includes a saddle (e.g., seat) 100 that supports a frontal side 102 of the rider 68 within the motion simulator ride 10. For example, the saddle 100 provides a seat onto which the rider 68 may mount (straddle) during loading of the motion simulator ride 10. The disclosed rider support unit 74 may allow the rider 68 to be positioned face-down with his/her legs on each side of the saddle 100 and with his/her knees bent when in position. In certain embodiments, the saddle 100 may be formed from adjustable components. For example, the saddle 100 may include a chest panel 104 that slides up and down to adjust inclination of the rider 68. The saddle 100 may also be configured to provide special effects features such as sound and vibration. This may provide the rider 68 with a realistic feeling of riding on a motorcycle or bicycle on various terrains with a screen projecting (e.g., the domed projection screen 14) a desired environment for the rider 68. In addition to the saddle 100, each rider support unit 74 includes a restraint system 106, e.g., one or more of a back restraint 106a, leg restraint 106b, and tail-end restraint 106c, that secures the rider 68 to the saddle 100 before the ride 10 begins, as discussed in further detail below. In the embodiments illustrated in FIGS. 7 and 8, the back restraint 106a is positioned at a leading end 110 of the saddle 100 and the tail-end restraint 106c is positioned at a tail end 112 of the saddle 100. A pair of handle bars 114 may extend from the saddle 100 at the leading end 110. Once the rider 68 is seated on the saddle 100, the rider 68 may lean forward to grab the handle bars 114. The handle bars 114 radially extend away from a superior surface 118 of the saddle 100 in an upward direction. However, in certain embodiments, the handle bars 114 may extend away from side surface of the saddle 100 or downwards. The handle bars 114 may allow the rider 68 to rest his/her arms during operation of the ride 10. The handle bars 114 may be adjustable to accommodate various rider sizes and rider comfort preferences. In addition to providing support for the rider 68, the handle bars 114 may allow the rider 68 to experience certain motions associated with riding (e.g., bicycling, motorcycling, and the like). For example, during operation of the motion simulator ride 10, the rider 68 may move the handle bars 114 in a manner that allows the rider 68 to feel as if he/she is driving a motorcycle, a glider, or any other suitable transportation device or pulling on a harness (e.g., when horseback riding or riding any other animal). In certain embodiments, the handle bars 114 may have control features that may allow the rider 68 to move the saddle 100 to enhance the feeling of riding. For example, the handle bars 114 may include gears that simulate acceleration and provide the feeling of speed to the rider 68 during operation of the ride 10. Present embodiments may also include sensing mechanisms or haptic feedback on the handle bars 114 that communicate with a controller of the ride 10 to facilitate incorporation of movement into feedback for a virtual reality experience (e.g., virtual hands may move in video being displayed for the rider 68 based on feedback from the handle bars 114). The saddle 100 may also include features that provide the rider 68 comfort. For example, the superior surface 118 of the saddle 100 may include contours such that the superior surface 118 conforms to a shape of a rider 68.

As discussed herein, the rider support unit 74 includes the rider restraint system 106 to secure the rider 68 on the rider support unit 74 during operation of the ride 10. The rider restraint system 106 includes the back restraint 106a, the leg restraint 106b, and the tail-end restraint 106c. The back restraint 106a may be implemented as a rotating restraint 148 positioned on and extending from the leading end 110 of the saddle 100 or other suitably-positioned structure of the rider support unit 74. The forward attachment point 111 of the rotating restraint 148 permits the rear 101 of the rider support unit 74 to be free of obstructions during loading and unloading. When actuated (e.g., electronically or manually), the rotating restraint 148 rotates about an axis 150 to move from an unrestrained configuration (FIG. 7) to a restrained configuration (FIG. 8) and secure the rider 68. For example, the rotating restraint 148 moves toward the tail end 112 of the saddle 100 to rest on a dorsal side 154 of the rider 68 (e.g., the rider's back) when the rotating restraint 148 is in the restrained configuration, as illustrated in FIG. 8. To move from the restrained to the unrestrained configuration (e.g., at the completion of the ride 10), the rotating restraint 148 moves away from the tail end 112 of the saddle 100 and towards the leading end 110, as illustrated in FIG. 7.

In the restrained configuration, shown in FIG. 8, the rotating restraint 148 may rest or extend along all or a portion of the dorsal side 154 of the rider 68 when the rotating restraint 148 is in the restrained configuration. For example, as shown in FIG. 8, a terminating end 160 of the rotating restraint 148 rests near shoulders of the rider 68. That is, the terminating end 160 the rotating restraint 148 extends along only a portion of the rider's upper back (e.g., upper portion of the dorsal side 154). However, for riders 68 of various sizes, the terminating end 160 of the rotating restraint 148 may rest on different positions on the back of the rider 68 (e.g., lower portion of the dorsal side 154). Extending the rotating restraint 148 such that the terminating end 160 is against a lower back of the rider's dorsal side 154 may further restrain the rider 68 from shifting within the saddle 100 during operation of the ride 10.

In certain embodiments, the rotating restraint 148 may include a pair of handles 162 on an outward facing surface 164 that may be used by an operator of the ride 10 to ensure the rotating restraint 148 is locked prior to starting the ride 10 and/or to move (e.g., lift) the rotating restraint 148 away from the dorsal side 154 of the rider 68, thereby allowing the rider 68 to unload the ride 10 after completion of the ride 10. While in the illustrated embodiment, the handles 162 are positioned on a top face of the outward facing surface 164, the handles 162 may be positioned on a side face of the outward facing surface 164. In certain embodiments, the handles 162 may not protrude out from the outward facing surface 164. Rather, the handles 162 may be one or more recesses along the outward facing surface 164 that allow the operator of the ride 10 to insert their hand, grip, and lift or push down the rotating restraint 148 during loading/unloading.

In addition to the back restraint 106*a*, the leg restraint 106*b* and the tail-end restraint 106*c* also secure the rider 68 to the rider support unit 74. The leg restraint 106*b* holds legs 170 of the rider 68 in a desired position. The leg restraint 106*b* includes a pair of arms 174 radially extending away from each side surface 130, 132 of the saddle 100 adjacent to the tail end 112. Each pair of arms 174 includes a fixed member 178 and a movable member 180. The fixed member 178 is positioned in front of the movable member 180 such that when the rider 68 is seated in the saddle 100, a front side of the legs 170 of the rider 68 abut a surface 182 of the fixed member 178.

Figure 9:
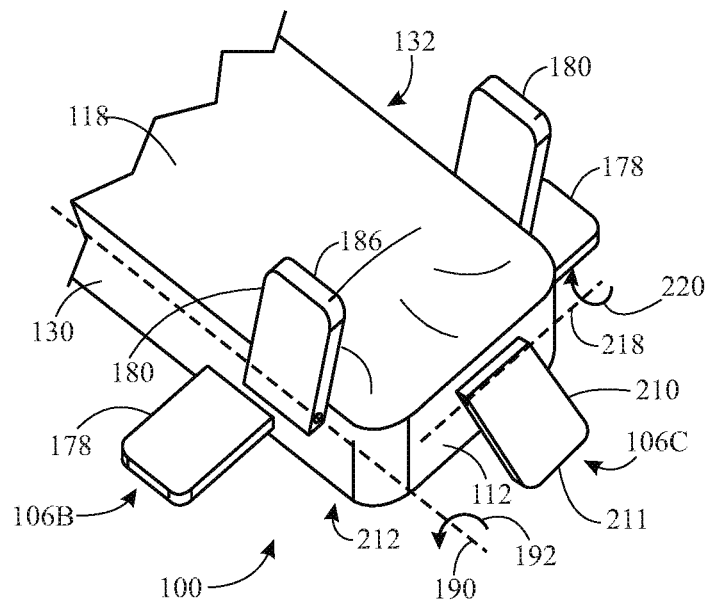
FIG. 9 is a top perspective view of a portion of the rider support unit of FIGS. 7 and 8, whereby the leg and tail-end restraints are in an unrestrained configuration and a movable member of the leg restraint is positioned against a side surface of a saddle of the rider support unit and extends above a superior surface of the saddle, in accordance with an embodiment of the present disclosure.
Figure 10:
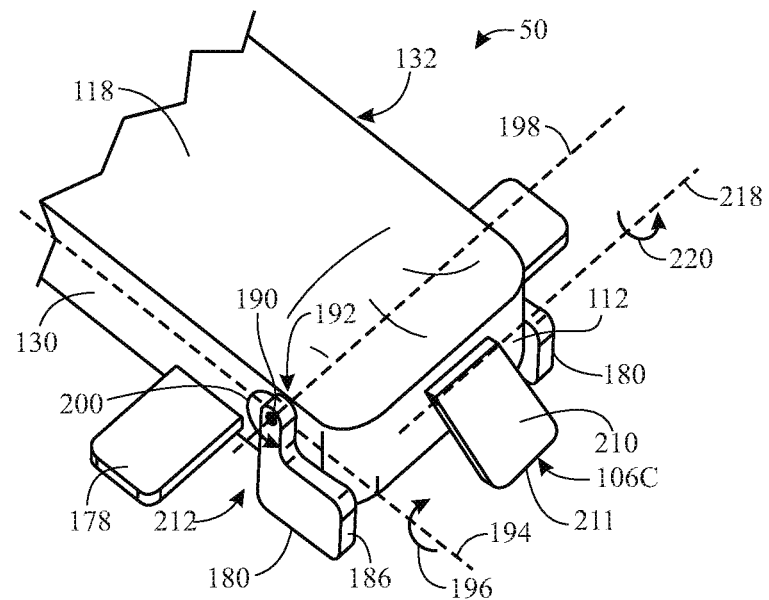
FIG. 10 is top perspective view of a portion of the rider support unit of FIGS. 7 and 8, whereby the leg and tail-end restraints are in an unrestrained configuration and the a movable member of the leg restraint is positioned against a side surface of a saddle of the rider support unit and extends toward a tail end of the saddle, in accordance with an embodiment of the present disclosure.

The moveable member 180 may move from an unrestrained configuration to a restrained configuration. FIGS. 9 and 10 illustrate embodiments of the movable member 180 and an arm 210 of the tail-end restraint 106*c* in the unrestrained configuration. In the unrestrained configuration, the moveable member 180 may be positioned in a manner that does not interfere with loading of the rider 68. For example, as illustrated in FIG. 10, the moveable member 180 of the leg restraint 106*b* may be positioned orthogonal to the fixed member 178 in the unrestrained configuration. In certain embodiments, the moveable member 180 is folded up and down and positioned against (e.g., abutting) the side 130 of the saddle 100 such that an end 186 of the moveable member 180 is below the superior surface 118. That is, the movable member 180 is positioned orthogonal to both the fixed member 178 and the superior surface 118 of the saddle 100 in the unrestrained configuration shown in FIG. 10. To move to between the restrained and unstrained configurations, the movable member 180 may pivot at a pivoting joint 190 at an end 192 that is attached to the side 130, 132 of the saddle 100.

Figure 11:
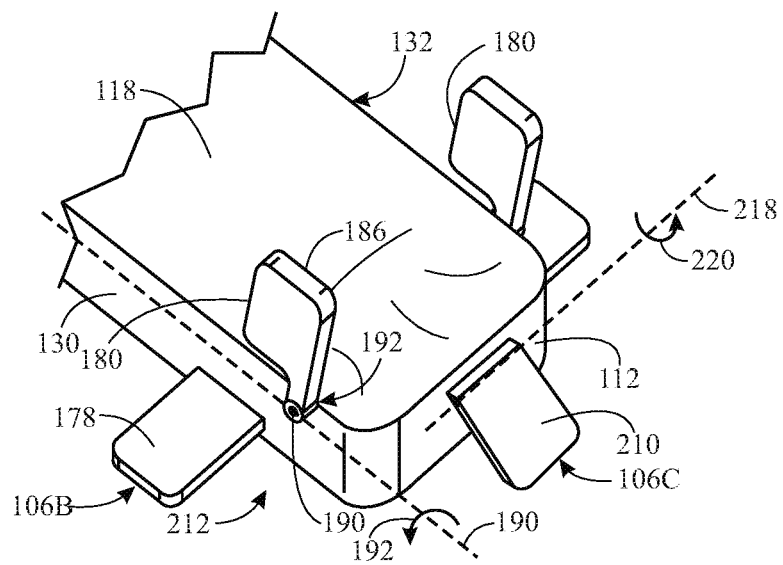
FIG. 11 is a top perspective view of the portion of the rider support units of FIG. 9, whereby the leg restraints are in a transitional configuration.

The pivoting joint 190 allows the movable member 180 to rotate relative to the saddle 100 and the fixed member 178 to move the movable member 180 between the unrestrained and restrained configurations. FIG. 11 shows an embodiment of an unrestrained position or a transition of the movable member between the unrestrained and restrained configurations. Folding back the movable member 180 toward the tail end 112 of the saddle 100 such that the moveable member 180 lays flat against the side 130, 132 of the saddle 100 and with the end 186 below the superior surface may enable the rider 68 to walk onto the saddle 100 and sit without having to raise one leg 170 over the saddle 100 or rise up to avoid the ends 186.

The rider 68 may position their legs 170 on the fixed member 178 after loading the rider support unit 74 and sitting on the saddle 100. For example, when properly positioned on the saddle 100, the forward facing portion of the rider's legs 170 between the knee and the ankle abut the fixed member 178. Once properly positioned, the movable member 180 may be actuated to move from the unrestrained configuration (FIG. 9) to the restrained configuration, as shown in FIG. 8. For example, the moveable members 180 of the leg restraint 106*b* may move away from the side surface 130, 132 of the saddle 100 and toward the fixed member 178 such that a portion of the rider's leg 170 is between the fixed member 178 and the moveable member 180. That is, the movable member 180 may move in a butterfly-like motion when actuated to move between unrestrained and restrained configurations. When moving from the unrestrained configuration to the restrained configuration, the movable member 180 may rotate about an axis to move the movable member 180 toward the fixed member 178. In the restrained configuration, the moveable member 180 extends away from the side surface 130, 132 of the saddle 100 in a manner similar to the fixed member 178. As such, the moveable member 180 is parallel to the fixed member 178. The members 178, 180 secure a portion of the rider 68 to the saddle 100 by sandwiching a portion of the legs 170 of the rider 68 between the members 178, 180. In this way, the members 178, 180 hold the legs 170 of the rider 68 in place during operation of the ride 10. In the embodiment illustrated in FIG. 9, the movable member 180 may rotate about an axis 194 of the saddle 100 that is parallel to the side 130, 132, as shown by arrow 196, to move the movable member 180 in a butterfly-like motion toward the fixed member 178.

Figure 12:
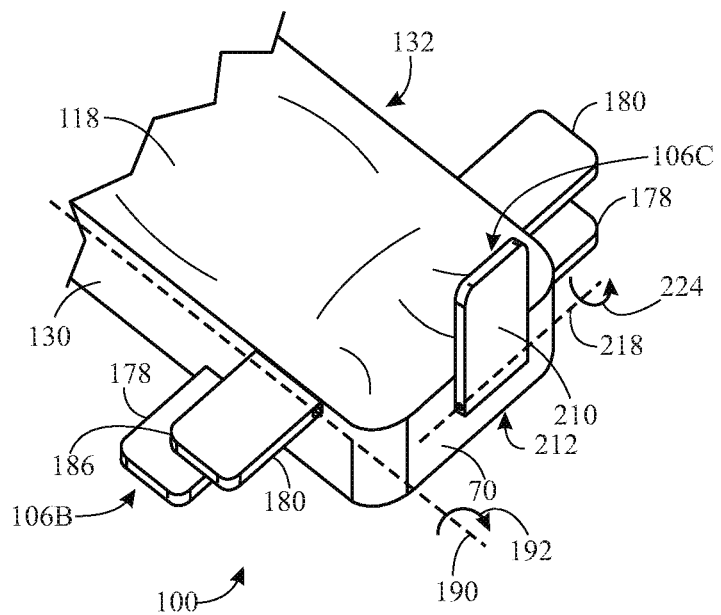
FIG. 12 is a top perspective view of the portion of the rider support unit of FIG. 10, whereby an arm of the tail-end restraint extends above a superior surface of the saddle in the restrained configuration.

Similarly, in the embodiment illustrated in FIG. 10, the movable member 180 rotates about the axis 194 to move the movable member 180 toward the fixed member 178 in the butterfly-like motion. However, before rotating about the axis 194, the movable member 180 rotates about an axis 198 that is orthogonal to the side 130, 132 of the saddle 100, as shown by arrow 200. Rotating the movable member 180 about the axis 198 toward the leading end 110 of the saddle 100 and away from the tail end 112 moves the movable member 180 in an upward direction such that the end 186 of the movable member 180 is above the superior surface 118, as illustrated in FIG. 12. Once the movable member 180 is rotated about the axis 198, the moveable member 180 rotates about the axis 194 (in the direction of arrow 196) to move the movable member 180 in the butterfly-like motion toward the fixed member 178 and into the restrained configuration.

Figure 13:
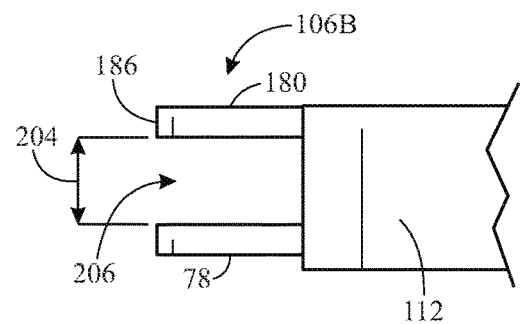
FIG. 13 is a side perspective view of the leg restraint of the rider support unit of FIGS. 7 and 8, whereby the leg restraint includes a gap between a fixed member and a movable member of the leg restraint when the leg restraint is in a restrained configuration, in accordance with an embodiment of the present disclosure.

In the restrained configuration, the members 178, 180 of the leg restraint 106*b* are spaced apart a distance 204, thereby forming a gap 206 sized to fit a portion of the rider's legs 170, as illustrated in FIG. 13. To accommodate various shapes and sizes of the rider 68, the distance 204 may be adjusted by moving the movable member 180 toward or away from the fixed member 178. As such, the legs 170 of the rider 68 may be secured and held in place during operation of the ride 10. The distance 204 between the members 178, 180 may be adjusted automatically (e.g., via a controller) or manually by an operator of the ride 10.

In some embodiments, both of the members 178, 180 of the leg restraint 106*b* are actuated. For example, both the members 178, 180 may be actuated in a butterfly-like motion to sandwich about the rider's legs 170 and hold them in place for the ride 10. In these particular embodiments, the members 178, 180 move in opposite directions toward one another to position the members 178, 180 in the restrained configuration, and away from one another to position the members 178, 180 in the unrestrained configuration.

As discussed herein, the restraint system 106 also includes the tail-end restraint 106c. Similar to the leg restraint 106b, the tail-end restraint 106c includes a movable arm 210 that moves from an unrestrained configuration to a restrained configuration in a manner similar to the movable member 180. In the unrestrained configuration, the movable arm 210 is positioned orthogonal to a bottom surface 212 of the saddle 100 and a free end 211 extends away from the tail end 112 in a downward direction (e.g., a direction that is away from and at or below the superior surface 118 of the saddle 100 toward the rider's legs 170).

After loading and proper positioning of the rider 68 on the saddle 100, the moveable arm 210 moves in an upward direction (e.g., a direction toward the superior surface 118 of the saddle 100) until the moveable arm 210 is orthogonal to the superior surface 118 of the saddle 100. For example, when actuated, the movable arm 210 rotates about an axis 218 in an upward direction (e.g., a direction that is away from the bottom surface 212 of the saddle 100 toward the dorsal side 154 of the rider 68) toward the superior surface 118, as shown by arrow 220. Rotating the movable arm 210 in the direction 220 moves the movable arm 210 from the unrestrained configuration to the restrained configuration, as shown in FIG. 12. In the restrained configuration, the movable arm 210 is positioned orthogonal to the superior surface 118 of the saddle 100 and extends away from the tail end 112 in the upward direction. In this way, the movable arm 210 provides support for the rider 68 at the tail end 112 of the saddle 100 to block the rider 68 from sliding past the tail end 112. To move the moveable arm 210 from the restrained configuration to the unrestrained configuration, the movable arm 210 rotates about the axis 218 in a direction 224 that is opposite the direction 220, as shown in FIG. 11.

Figure 14:
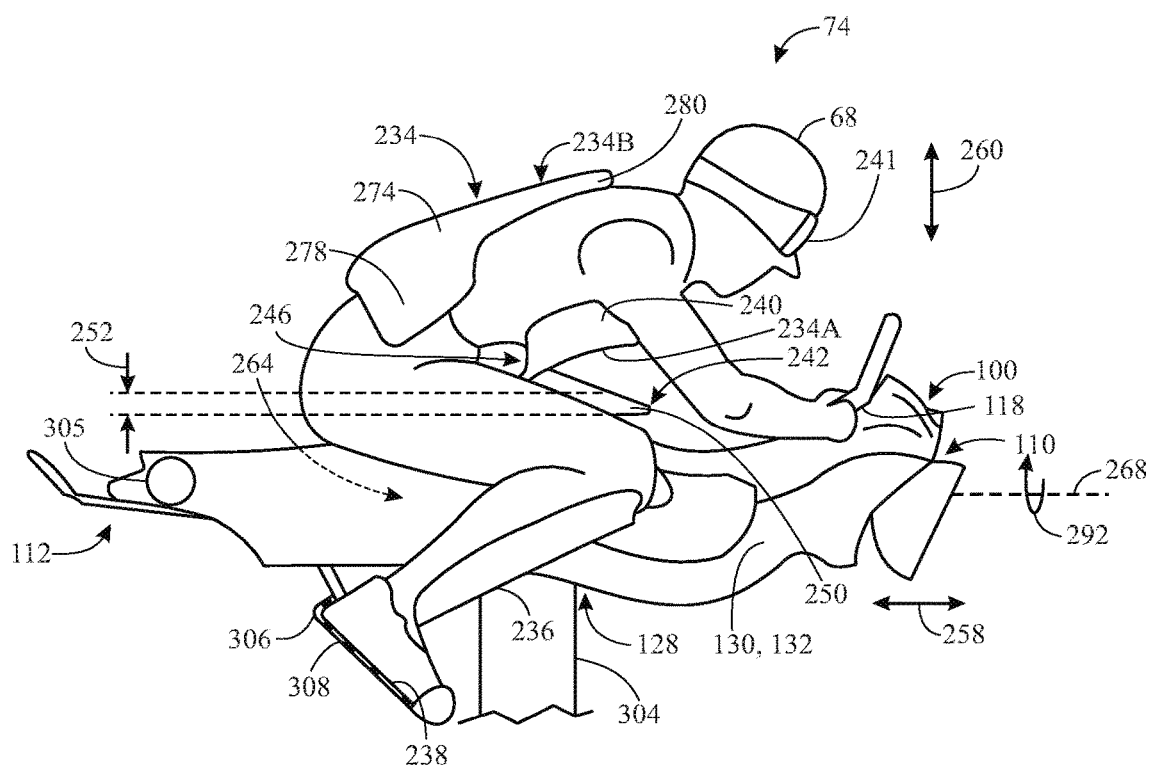
FIG. 14 is a side perspective view of a rider support unit of the motion simulator ride assembly of FIGS. 2-4 having a clamshell restraint system that restrains a rider, in accordance with an embodiment of the present disclosure.

The rider support unit 74 may include other restraint and saddle configurations. For example, FIG. 14 is a side view of an embodiment of the rider support unit 74 having a clamshell restraint system 234 having a front torso restraint 234a and a rotating restraint 234b that rotates from a rear position relative to the rider 68. In addition to the clamshell restraint system 234, the rider support unit 74 includes a leg support member 236 and a foot rest 238. In the illustrated embodiment, the front torso restraint 234a is positioned at the midsection 128 and extends from the superior surface 118 of the saddle 100. The front torso restraint 234a is inclined toward the leading end 110 of the saddle 100 such that an outer shell surface 240 (e.g., surface that is not in contact with the rider's torso) forms an acute angle 242 with the superior surface 118 of the saddle 100. When the rider 68 mounts the saddle 100, the rider 68 rests their front torso on an inner shell surface 246. The inclination of the front torso restraint 234a toward the leading end 110 allows the rider 68 to be positioned at an incline in a manner similar to riding a bicycle, motorcycle, or on the back of an animal (e.g., horseback riding/racing). The inner shell surface 246 of the front torso restraint 234a may be contoured (e.g., have a convex shape) to provide comfort and support to the rider's torso. The inner shell surface 246 may include foam and/or gel material that conform to the rider's torso, thereby providing comfort and support during operation of the ride 10.

In certain embodiments, the front torso restraint 234a may be fixed. In other embodiments, the front torso restraint 234a may be movable. For example, the front torso restraint 234a may move relative to the superior surface 118 of the saddle 100 to adjust a position of the front torso restraint 234a along a length of the saddle 100 and accommodate different rider sizes and shapes. The front torso restraint 234a may slide along the superior surface 118 to move the front torso restraint 234a toward or away from the rotating restraint 234b, as shown by arrow 258. In addition to or alternatively, the front torso restraint 234a may move toward or away from the superior surface 118, as shown by arrow 260, to adjust an inclination of the front torso restraint 234a.

The front torso restraint 234a may include an extension 250 adjacent to the superior surface 118 of the saddle 100. The extension 250 extends from the outer shell surface 240 toward the leading end 110 of the saddle 100. In the illustrated embodiment, a dimension 252 of the extension 250 decreases along a length of the extension 250 from the outer shell surface 240 toward leading end 110 such that the extension 250 has a tapered shape. However, in certain embodiments, the dimension 252 of the extension 250 may be constant along the length of the extension 250. The extension 250 allows the rider 68 to rest a portion of their legs 170 (e.g., inner thigh) when seated in the saddle 100. As such, the extension 250 provides support for the rider's legs 170 and mitigates shifting of the rider 68 during operation of the ride 10.

Figure 15:
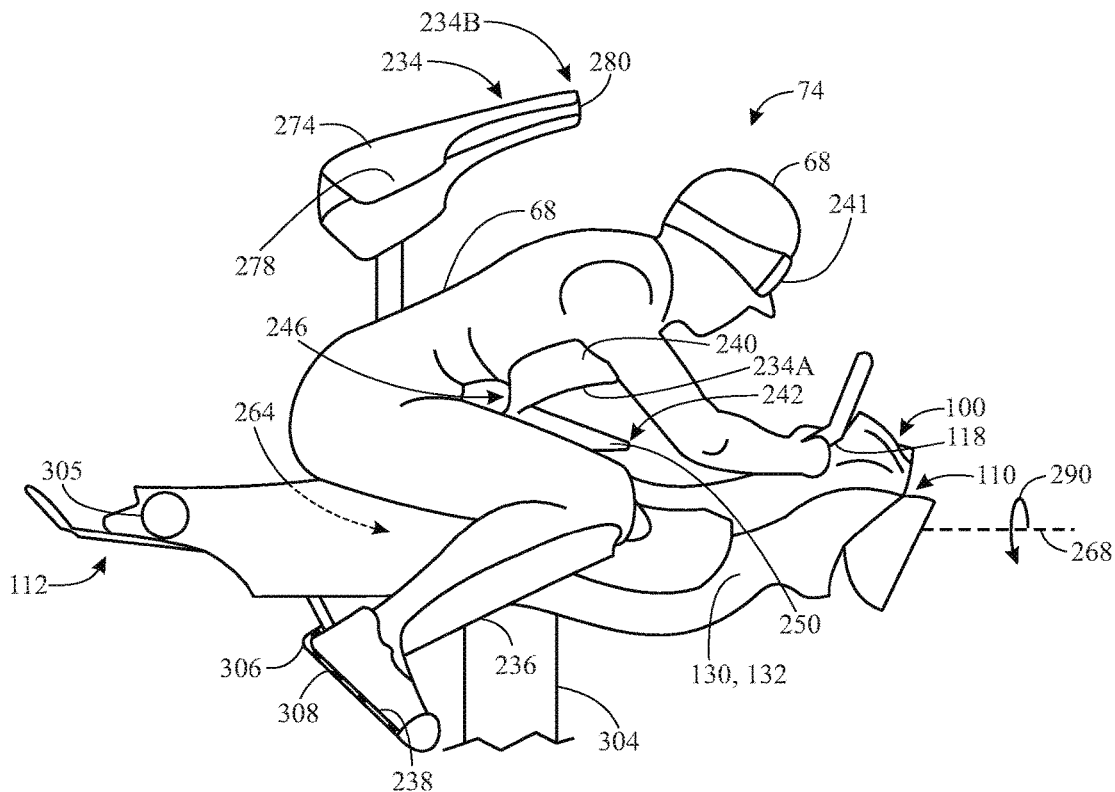
FIG. 15 is a side perspective view of the rider support unit of FIG. 14, whereby the clamshell restraint system is in an unrestrained configuration.

Similar to the front torso restraint 234a, the rotating restraint 234b extends from the superior surface 118 of the saddle 100. The rotating restraint 234b includes a pivoting arm positioned on a side 264 of the saddle 100. The pivoting arm partially rotates about an axis 268 that is parallel to the saddle 100 to move the rotating restraint 234b from the unrestrained configuration to the restrained configuration (FIG. 15). The pivoting arm may include a support arm that couples to a surface of the side 264 and a back support 274 extending from the support arm that clamshells the rider 68 between the restraints 234a, 234b. The back support 274 includes wings 278 that wrap around a portion of the rider's lower back. The wings 278 include features that conform to the rider's back. For example, the wings 278 may have a contoured shape (e.g., convex shape) that conforms to the lower back of the rider 68.

The back support 274 also includes an upper back support 280 extending from the wings 278 and terminating adjacent to the rider's shoulders. Similar to the wings 278, the upper back support 280 may have a convex shape such that it conforms to the contours of the rider's back torso (e.g., posterior surface of rider's torso). The back support 274 may include additional features to provide rider comfort during operation of the ride 10. For example, the back support 274 may include foam and/or gel materials that may provide a cushion for the rider 68 when the rider 68 is restrained in the rider support unit 74.

During loading, the rider 68 may lift one leg 170 over the saddle 100 such that each leg is positioned against a respective side surface 130, 132 and the midsection 128 of the saddle 100 is between the legs 170 of the rider. Once seated, the rider 68 positions their foot on the respective foot rest 238 and rests a portion of their leg 170 on the leg support member 236. The rider 68 may lean forward to rest their front torso (e.g., anterior surface of the rider's torso) on the inner shell surface 246 of the front torso restraint 234a and hold onto the handle bars 114. When the rider 68 is properly positioned on the saddle 100, the front torso restraint 234a and the rotating restraint 234b, in combination, clamshell the rider 68 to secure the rider 68 in the rider support unit 74.

For example, in the unrestrained configuration, the back support 274 may be orthogonal to the side 264 of the saddle 100 such that a distance between the superior surface 118 and back support 274 increases. Once the rider 68 is positioned on the saddle 100, the pivoting arm is actuated to move the back support 274 toward the rider 68. The pivoting arm partially rotates about the axis 268 in a direction 290 toward the superior surface 118, which decreases the distance between the back support 274 and the superior surface 118, until the back support 274 abuts the back torso of the rider 68 to move the rotating restraint 234b from the unrestrained configuration (FIG. 15) to the restrained configuration (FIG. 14). Similarly, the pivoting arm partially pivots about the axis 268 in a direction 292 away from the superior surface 118, which increases the distance between the superior surface 118 and the back support 274, and releases the rider 68 from the rider support unit 74.

In certain embodiments, the rider support unit 74 may be coupled to a track above or below the rider support unit, e.g., via a beam 304 or extending structure extending above or below the rider support unit 74, as appropriate. The rider support unit 74 may also include a pivoting member 305 that may facilitate up and down movement of the rider support unit 74. In certain embodiments, individual rider support units 74 may move along a track and may actuate personalized effects, e.g. via individually addressable headsets 241 or via motion or other controllers responsive to rider input. For example, the restraint system may be coupled to one or more sensors 308, shown by way of example as being positioned on a foot restraint 306. However, it should be understood that the one or more sensors 308 may be positioned, additionally or alternatively, on other features of the rider support unit 74. In one embodiment, the sensor 308 is a pressure sensor that generates a signal indicative of rider foot pressure that indicates a desired leaning or tilting motion, e.g., that is indicative of more pressure on one foot than the other foot. Based on the pressure signal, the saddle 100 may be actuated to lean in a corresponding direction. The sensor 308 may be one or more of a pressure sensor, an optical sensor, motion sensor, or any other suitable sensor that actuates special effects or movement on the rider support unit 74 to simulate riding (e.g., a motorcycle, bicycle, an animal, or the like) and combinations thereof to provide a realistic and personalized experience for the rider 68.

In certain embodiments, the sensors 308 may transmit the signal to the display screen (e.g., a virtual reality (VR) screen) that cause a change in a virtual scene displayed on the display screen or a trajectory (i.e., path) of the rider support unit 74. For example, the rider support unit 74 may be part of a roller coaster. The saddle 100 of the rider support unit 74 may include foot pedals that allow the rider to control speed, acceleration, braking, and the like during operation of the ride 10. The foot pedals may include the sensor 308 such that changes in pressure resulting from braking based on actuation of a foot pedal results in a change in the virtual scene displayed on the display screen and/or the path. In certain embodiments, the signal from the sensors 308 may change the virtual scene displayed and/or the path depending on the leaning or tilting motion associated with the pressure signal. Accordingly, the rider 68 may control the virtual scene displayed and/or the path to provide a personalized experience of riding.

Figure 16:
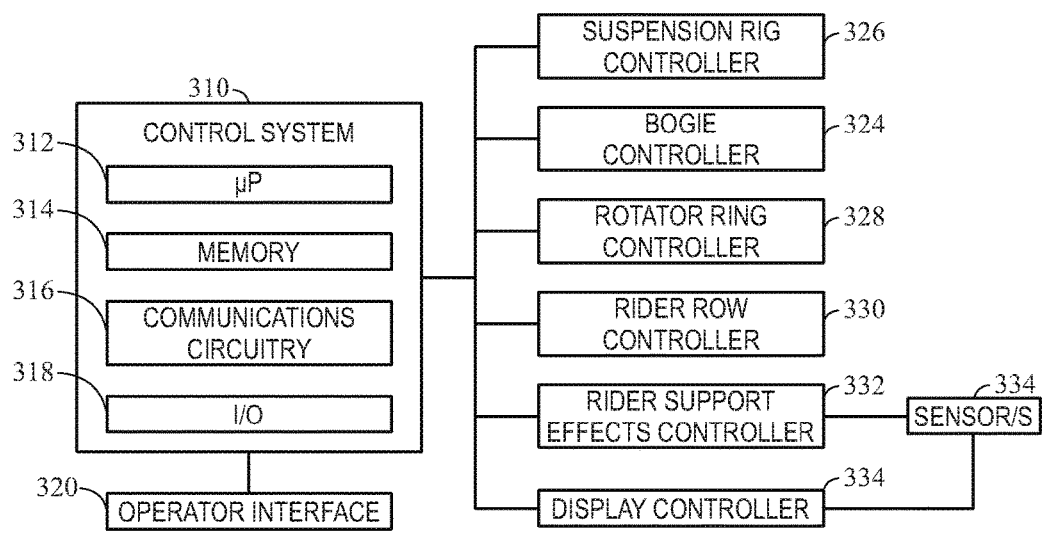
FIG. 16 is a block diagram of a motion simulator ride control system in accordance with present techniques.

As discussed herein, the rider support unit 74 provides the rider 68 with a feeling of riding (e.g., on the back of an animal, bicycle, motorcycle, or the like) by positioning the rider 68 facedown on the saddle 100, thereby allowing the rider 68 to assume a position similar to that of riding a bicycle/motorcycle, or animal. As discussed herein, the ride 10 may include a domed projection screen 14 below the rider support assembly 12 (e.g., FIG. 1). However, in other embodiment, the display screen may be omitted or supplemented with a display screen on the rider support unit 74. For example, in one embodiment, the display screen may be a virtual reality (VR) screen that is part of a virtual reality (VR) docking station supporting a virtual reality system that simulates a desired environment to the rider 68. For example, returning to FIGS. 7 and 8, the rider support unit 74 includes a VR headset 300 that may be used to project the simulated environment to the rider 68. The VR docking station 300 is disposed at the leading end 110 of the rider support unit 74 such that the VR screen 302 is positioned in the field of view of the rider 68 when facing down (e.g., below the rider 68 or in front of the rider's head). For example, in the illustrated embodiments, the VR docking station 300 and the VR screen 302 are disposed between the handle bars 114 of the rider support unit 74. The VR docking station 300 and the VR screen 302 on the rider support assembly 12 projects the environment to each individual rider 68. The VR screen 302 is communicatively coupled to a control system of the motion simulator ride 10 that provides instructions that enable each VR screen 302 to display the simulated environment for each rider 68. The rider 68 may wear 3D eyewear (e.g., headset 241 as shown in FIG. 16, glasses, goggles, headband) during operation of the motion simulator ride 10 to experience the feeling of being in the simulated environment. The 3D eyewear may be wireless or coupled to the VR docking station 300 via a cabled connection. The back restraint 106a may include a tether that couples to and secures the 3D eyewear to the rider support unit 74, thereby mitigating separation of the 3D eyewear from the rider 68 during operation of the ride 10.

The VR docking station 300 may include an adjustable feature that allows each rider 68 to adjust the screen to a setting that is suitable for viewing the projected environment. For example, the adjustable feature may allow the rider 68 to adjust a distance between the screen 302 and the rider 68. In certain embodiments, the adjustable feature may allow the rider 68 to tilt (e.g., incline) the screen 302 such that viewing is enhanced for each individual rider 68. The adjustable feature may also allow the rider 68 to adjust a contrast or brightness of the screen 302.

In some embodiments, the VR docking station 300 includes various joints (e.g., linking and hinge mechanisms) that allow a rider 68 to move his or her head to look around while engaged with the VR docking station 300. Specifically, the VR docking station 300 may allow the rider 68 to turn his or her head from side to side and or move it up and down along tracks (e.g., semicircular tracks) or using a ball joint. The VR docking station 300 may include a full VR headset that the rider 68 engages with or it may include components (e.g., the VR screen 302) that engage with components in a headset on the rider 68 to facilitate presentation of VR effects as a full VR headset when coupled together. Further, it should be noted that the riders 68 may use a full or partial VR headset that they have placed on their heads prior to boarding the ride 10. In some embodiments, the VR headset includes a screen and docking with the ride 10 merely provides an input to the VR headset. However, in other embodiments, the VR screen 302 that provides the VR environment is integral with the ride 10 and the VR headset includes shell components, which may include lenses that engage with the VR screen 302 for the duration of the ride 10. These embodiments allow riders 68 to adjust the VR headsets or partial headsets on their heads/faces prior to boarding and may facilitate throughput for the ride 10 by avoiding delays caused by riders 68 making adjustments when they get seated. In some embodiments, only minor adjustments (e.g., focusing) and/or connecting the headset shell to the VR docking station 300 are done after boarding the ride 10. In still further embodiments, the VR docking station 300 facilitates short range wireless interaction with the VR headsets. Riders 68 may own their own VR headset and/or VR headset shell or may acquire one (e.g., via purchase or for return) while waiting in a queue for the ride 10.

As should be appreciated, the rider support unit 74 may include any other suitable display screen that uses any suitable projecting principles and systems to project the desired environment to allow the rider 68 to experience the feeling of riding (e.g., horseback riding, bicycling, riding a motorcycle, or the like). For example, in certain embodiments, the rider support unit 74 may include a display screen (e.g., headset) that utilizes OLED technology to display imagery.

The motion simulator ride 10 may operate under a control system 310, as shown in the block diagram of FIG. 16. The control system 310 may include a processor 312, which may include one or more processing devices, and a memory 314 storing instructions executable by the processor 312. The memory 314 may include one or more tangible, non-transitory, machine-readable media. By way of example, such machine-readable media can include RAM, ROM, EPROM, EEPROM, optical disk storage, magnetic disk storage or other magnetic storage devices, or any other medium which can be used to carry or store desired program code in the form of machine-executable instructions or data structures and which can be accessed by the processor 312 or by any general purpose or special purpose computer or other machine with a processor. The control system 310 may also include communications circuitry 316 and/or input and output circuitry 318 to facilitate communication with other components of the simulator ride 10. In addition, the control system 310 may be coupled, either directly or wirelessly, to an operator input device or operator interface 320 that, in operation, may be used by a ride technician to provide input used to control one or more ride features. The operator interface 320, or other components of the ride 10, may be located remotely from the control system 310 in certain embodiments and may be, for example, implemented on a mobile device.

In operation, the control system 310 may control movement of various components of the rider support ride assembly 12. It should be understood that the ride 10 may include some or all of the components of the rider support assembly 12 in the illustrated embodiment, depending on the configuration. For example, the control system 310 may communicate with and provide instructions to a bogie controller 324 to control velocity and/or braking. The control system 310 may also control riding simulation motion via control of a suspension rig controller 326 and a rotator ring controller 328. In addition, the control system 310 may also provide instructions to a rider row controller 330 to control positioning of the rider 68 and the restraint system 106, 234. For example, the control system 310 may actuate the restraint system 106, 234 after loading and before unloading to move the restraint system 106, 234 into the restrained configuration and unrestrained configuration, respectively. The control system 310 may transmit a lock signal to the restraint system 106, 234 once the rider 68 is properly positioned within the rider support unit 74. In certain embodiments, the saddle 100 of the rider support unit 74 may include sensors that detect the presence of the rider 68. Once detected, the control system 310 may actuate the restraint system 106, 234 to move the restraint system 106, 234 from the unrestrained configuration to the restrained configuration, thereby restraining and securing the rider 68. Upon completion of the ride 10, the control system 310 may detect that the rider support assembly 12 is at an unloading station of the ride 10 and deactivate the restraint system 106, 234 to move the restraint system 106, 234 from the restrained configuration to the unrestrained configuration, thereby releasing the rider 68 from the rider support unit 74. In other embodiments, an operator of the ride 10 may actuate the restraint system 106, 234 manually or by activating a switch on the control system 310.

The control system 310 may also provide instructions to one or more special effects controllers, such as rider support effect controllers 332 (e.g., to control circuitry in the saddle 100, chest plates, handle bars 114, or head gear to cause audio or visual effects, vibrations, impact effects, or changes in temperature) or display controllers 334. The control system 310 may be configured to independently address each rider support unit 74 for individual control of effects, e.g., each rider support unit 74 may be capable of providing unique and separate effects relative to other rider support units 74.

As discussed above, the rider support unit 74 may include the one or more sensors 308 that may be used to control certain features of the rider support unit 74. For example, the one or more sensors 308 may transmit a signal based on an input (e.g., an input from the rider 68 and/or component of the motion simulator ride 10) to the control system 310. Upon receiving the signal from the one or more sensors 308, the control system 310 may change an image on the display screen (e.g., on the individually addressable headset 241) and/or tilt or lean the rider support unit 74. For example, the control system 310 may send instructions to the rider support effect controller 332 and/or the display controller 334 in response to the signal received from the one or more sensors 308. The instructions cause the rider support effect controller 332 and/or the display controller 334 to actuate special effect features (e.g., leaning or tilting) on the saddle 100 or the individually addressable headset 241 to create a realistic feeling of riding. In certain embodiments, the one or more sensors 308 may transmit the signal directly to the rider support effect controller 332 and/or the display controller 334.

Certain existing motion simulator ride systems use ride vehicles having walls that enclose a rider and may separate the rider from a desired environment of a motion simulator ride. These rider vehicles may not be suitable for providing the rider with an experience of riding a motorcycle, bicycle, on the back of an animal (e.g., horseback riding), or the like. However, it is now recognized that by using an actuatable saddle-like rider support unit with restraints as provided herein and positioning a projection screen below the rider or by using a headset-based display, the motion simulator ride may provide the rider with a realistic feeling of riding a motorcycle, bicycle, or on the back of an animal.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A motion simulator ride assembly comprising:
a motion base; and
a rider support assembly positioned beneath and coupled to the motion base, wherein the rider support assembly comprises a plurality of rider support units each comprising:
a saddle having a leading end, a tail end, and a superior surface configured to support a rider in a facedown position; and
a restraint system configured to secure the rider onto the rider support, wherein the restraint system comprises a rotating restraint positioned at the leading end and having an attachment point on a leading edge of the saddle, and wherein the rotating restraint is configured to move relative to the superior surface to move the rotating restraint from an unrestrained configuration to a restrained configuration, and wherein the rotating restraint is configured to abut against a posterior surface of a torso of the rider when the rotating restraint is in the restrained configuration; and
a display screen configured to project a simulated environment, wherein the display screen is positioned below the motion base.

2. The motion simulator ride assembly of claim 1, comprising a leg restraint having a first member and a second member positioned on a side surface of the saddle proximate the tail end, wherein the second member is spaced apart from the first member and configured to move relative to the first member to move the leg restraint from a restrained configuration to an unrestrained configuration.

3. The motion simulator ride assembly of claim 1, wherein the restraint system comprises a tail-end restraint comprising a movable member comprising a free end and a coupled end positioned at the tail end of the saddle, wherein the movable member is configured to rotate to move the free end toward or away from the superior surface of the saddle such that in the restrained configuration the free end of the tail-end restraint is positioned above the superior surface, and in the unrestrained configuration, the free end of the tail-end restraint is positioned substantially level with or below the superior surface.

4. The motion simulator ride assembly of claim 1, wherein the restraint system comprises a chest panel extending from the superior surface of the saddle and configured to abut an anterior surface of a torso of the rider when the rider is positioned within a rider support unit of the plurality of rider support units.

5. The motion simulator ride assembly of claim 1, comprising a cable suspension rig coupled to the motion base and to a bogie configured to move the rider support assembly along a ride path.

6. A ride system, comprising:
an individual rider support unit;
a saddle of the individual rider support unit having a leading end, a tail end, and a superior surface configured to support a rider in contact with the superior surface in a hunched position; and
a restraint system coupled to the individual rider support unit and comprising a rotating restraint positioned at the leading end and coupled to a leading edge of the saddle, wherein the rotating restraint is configured to rotate relative to the superior surface to move the rotating restraint from an unrestrained configuration to a restrained configuration, and wherein the rotating restraint is configured to abut a posterior surface of a torso of the rider when the rotating restraint is in the restrained configuration.

7. The ride system of claim 6, comprising at least one of a foot restraint or a leg restraint coupled to the individual rider support unit and comprising a sensor configured to transmit a sensor signal to a controller based in response to a pressure input from the rider, wherein the controller is configured to adjust movement of the saddle in response to the sensor signal.

8. The ride system of claim 7, comprising a headset configured to be worn by the rider and a display controller configured to receive the sensor signal and provide instructions to change a display of the headset based on the sensor signal.

9. The ride system of claim 8, wherein the display controller is positioned on the individual rider support unit.

10. The ride system of claim 7, wherein the controller is configured to actuate the individual rider support unit in response to the sensor signal independently of additional rider support units.

11. The ride system of claim 6, wherein the rotating restraint and the saddle form a clamshell restraint.

12. The ride system of claim 6, comprising a track coupled to the individual rider support unit such that the individual rider support unit is configured to move along the track under control of a ride controller.

13. The ride system of claim 12, comprising additional rider support units engaging the track and configured to move along the track via a bogie under control of the ride controller, wherein the additional rider support units are coupled the same bogie.

14. The ride system of claim 12, comprising additional rider support units engaging the track and configured to move along the track via a bogie under control of the ride controller, wherein the additional rider support units are coupled to a different bogie.

15. The ride system of claim 1, wherein the individual rider support unit is coupled the track via a beam extending from the individual rider support unit.

16. A rider support assembly, comprising:
one or more rider support units each comprising:
a saddle having a leading end, a tail end, and a superior surface extending between the leading end and the tail end, wherein the superior surface is configured to support a rider of a motion simulator ride in a facedown position;
a restraint system comprising:
a torso posterior restraint comprising a rotating restraint extending from a leading end of the saddle and configured to move relative to the superior surface from an unrestrained configuration to a restrained configuration, wherein the torso posterior restraint abuts a posterior surface of a torso of the rider when the torso posterior restraint is in the restrained configuration; and a tail-end restraint having a free end and a coupled end, wherein, in the unrestrained configuration, the free end of the tail-end restraint is positioned substantially level with or below the superior surface and wherein, in the restrained configuration, the free end of the tail-end restraint is positioned above the superior surface.

17. The rider support assembly of claim 16, wherein the restraint system comprises a leg restraint comprising a first member and a second member spaced apart from the first member, wherein the second member is configured to move relative to the first member, and wherein the first and second members are positioned on a side surface of the saddle.

18. The rider support assembly of claim 16, wherein a free end of the rotating restraint moves in a direction toward the tail end when the torso posterior restraint is in the restrained configuration.

19. The rider support assembly of claim 16, comprising a virtual reality (VR) headset.

* * * * *